United States Patent [19]

Schober et al.

[11] Patent Number: 5,786,788
[45] Date of Patent: Jul. 28, 1998

[54] RADAR SYSTEM AND METHOD FOR REDUCING RANGE SIDELOBES

[75] Inventors: Michael B. Schober; Carlos A. Davila, both of Tucson, Ariz.

[73] Assignee: Raytheon Company, Los Angeles, Calif.

[21] Appl. No.: 727,108

[22] Filed: Oct. 8, 1996

[51] Int. Cl.⁶ ................................................ G01S 7/292
[52] U.S. Cl. ...................... 342/159; 342/162; 342/189; 342/195; 342/203
[58] Field of Search ............................ 342/159, 162, 342/39, 101, 189, 195, 203

[56] References Cited

U.S. PATENT DOCUMENTS

| | | | |
|---|---|---|---|
| 4,095,225 | 6/1978 | Erikmats | 342/195 |
| 4,121,295 | 10/1978 | Witt | 364/724 |
| 4,176,351 | 11/1979 | DeVita et al. | 342/111 |
| 4,626,853 | 12/1986 | Lee et al. | 342/132 |
| 4,901,082 | 2/1990 | Schreiber et al. | 342/89 |
| 5,070,337 | 12/1991 | Chen et al. | 342/201 |
| 5,140,332 | 8/1992 | Martin et al. | 342/202 |
| 5,414,428 | 5/1995 | Gallagher et al. | 342/132 |
| 5,568,150 | 10/1996 | Taylor, Jr. et al. | 342/189 |

*Primary Examiner*—John B. Sotomayor
*Attorney, Agent, or Firm*—David W. Collins; Leonard A. Alkov; Glenn H. Lenzen, Jr.

[57] ABSTRACT

A system (10) for reducing range sidelobes adapted for use with pulsed radar systems. The inventive system (10) includes a mismatched filter (90) for correlating a received signal (84) with a correlator signal (92) having a different length than the transmit signal (84) and for providing a predetermined number of reduced range sidelobes (97) at the output of the mismatched filter (90). The mismatched filter (90) has a first locally optimum sequence that is the correlator signal (92). The mismatched filter (90) has an input device (86) for receiving an extended locally optimum sequence (84) that is a received signal (84). The first locally optimum sequence (92) is a sub-sequence of the extended locally optimum sequence (84). In a specific embodiment the mismatched filter (90) has a Barker-based code that is the correlator signal (92). The mismatched filter (90) has an input device (86) for receiving an extended Barker-based code that is a received signal (84). The extended Barker-based code (84) includes the Barker-based code (92) as a sub-sequence.

18 Claims, 6 Drawing Sheets

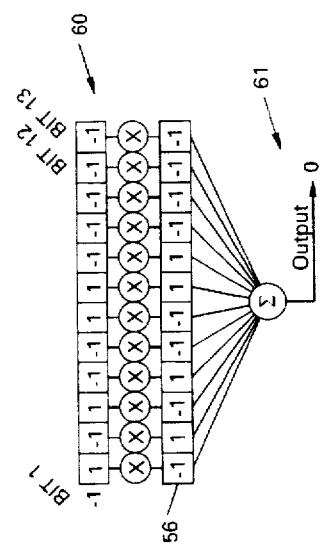
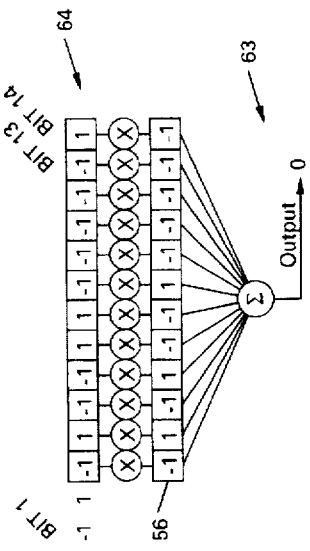
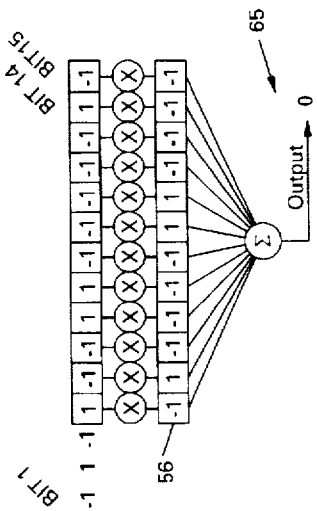
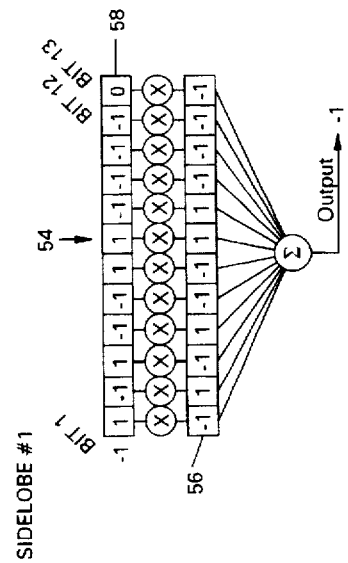
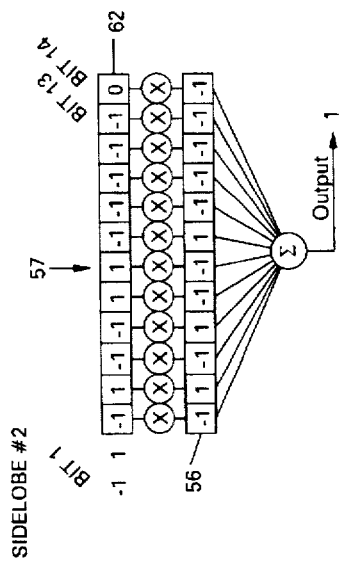
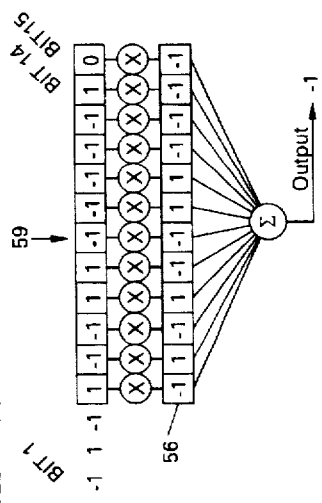
FIG. 9a  FIG. 9b  FIG. 9c

RADAR SYSTEM AND METHOD FOR REDUCING RANGE SIDELOBES

BACKGROUND OF THE INVENTION

1. Field of Invention

This invention relates to pulsed radar systems. Specifically, the present invention relates to systems and methods for reducing the range sidelobes of compressed pulse radar systems thereby facilitating the detection of small targets in the presence of large targets.

2. Description of the Related Art

Radar systems are used in a variety of applications ranging from missile guidance systems to air traffic control systems. Such applications require radar systems to accurately detect and discriminate targets. A typical radar system has a transmitter and a receiver. The transmitter transmits a signal and the receiver detects signals that are reflected back to the receiver. Signals that are reflected back are known in the art as radar returns.

In pulsed radar systems, the transmitter transmits a pulsed signal at a specified frequency. If a target is present, the received signal is a delayed version of the transmitted signal. Pulsed systems facilitate the calculation of the delay which is used to calculate the distance to the target. If no target or object is present, the received signal is noise only.

The transmitted signal is compared with the received signal to determine if a target is present. Often, the received signal is heavily corrupted by noise and visual inspection of the received signal does not reveal the presence or absence of the target. Radar systems typically use correlation to overcome this difficulty. The correlation involves a summation of products of the received signal with the transmitted signal. The correlation is a measure of the similarity of the transmitted signal to the received signal. A large similarity between the transmitted and received signals corresponds to a large probability that a target has been detected which in turn corresponds to a large correlation between the signals.

Typically a correlator correlates the transmitted signal with the received signal. A correlator that is often used to perform this function is a matched filter. The signal used by the correlator for correlation is matched to the transmitted signal. The impulse response function of the correlator is a shifted folded version of the transmitted signal and hence also matches.

Output from the correlator is shown in a magnitude versus time graph for analog signals and a magnitude versus sequence number graph for digital signals. The output of the correlator has a main peak where the correlation between signals is the strongest. Several smaller peaks next to the main peak are range sidelobes.

Radar systems using matched filters often have large range sidelobes at the output of the correlators. This reduces their ability to detect small target returns close in range to stronger target returns. This is because the main peak of a small target return may be comparable in magnitude to the range sidelobes of a larger target return. The range sidelobes of the larger target return may obscure the small target return.

To improve detection of small target returns near large target returns, more complicated coding schemes were developed. Such coding schemes typically add much complexity to the transmitted wave form to reduce the range sidelobes. Several such coding schemes involve using poly-phase codes. Poly-phase coding schemes are often very difficult to implement, involve multiple phase shifts beyond 0/180 degree shifts, and involve using a large signal set. As a result, such systems are expensive and time consuming to build.

Complicated filters were also developed to reduce the range sidelobes of radar systems. One such filter is described in "Optimum Mismatched Filters for Sidelobe Suppression," by M. H. Achroyd and F. Ghani IEEE Trans AES-9 No. 2, March 1973, pp. 214–218. The filter is a specialized filter inserted into the receiver. The filter is expensive and time consuming to build and implement.

Hence, a need exists in the art for a radar system that cost effectively reduces range sidelobes for improving detection of radar targets.

SUMMARY OF THE INVENTION

The need in the art is addressed by the system for reducing range sidelobes of the present invention. In the illustrative embodiment the inventive system is adapted for use with pulsed radar systems and includes a mismatched filter for correlating a received signal with a correlator signal having a different length than the transmit signal and for providing a predetermined number of reduced range sidelobes at the output of the mismatched filter.

In a specific embodiment, the inventive system includes a computer for determining the transmit signal and the correlator signal for providing the reduced range sidelobes at the output of the mismatched filter.

In the preferred embodiment, the mismatched filter includes a correlator having a first locally optimum sequence that is the correlator signal. The mismatched filter has an input for receiving an extended locally optimum sequence that is the received signal. The first locally optimum sequence is a sub-sequence of the extended locally optimum sequence.

In an alternative embodiment the mismatched filter has a Barker-based code that is the correlator signal. The mismatched filter has an input for receiving an extended Barker-based code that is the received signal. The extended Barker-based code includes the Barker-based code as a sub-sequence.

In a specific embodiment, the mismatched filter is implemented with an adjustable length correlator and a programmable signal transmitter which may be implemented in computer software.

BRIEF DESCRIPTION OF THE DRAWINGS

FIGS. 9a, 9b and 9c illustrate a technique of the present invention for constructing a mismatched code sequence for a mismatched filter for achieving range sidelobe cancellation.

DESCRIPTION OF THE INVENTION

Figure 1A:
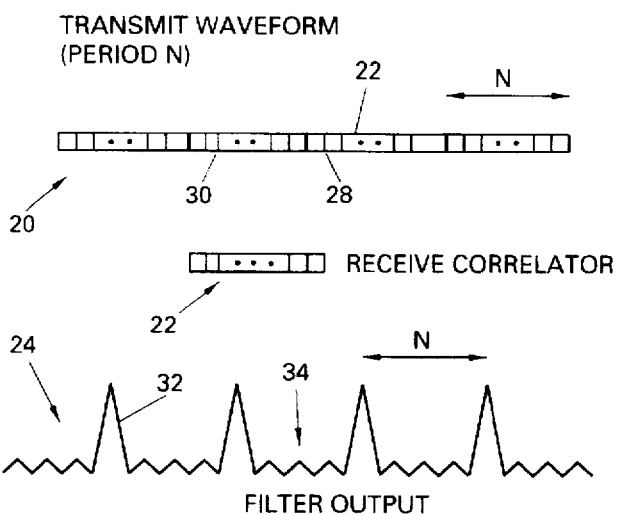
FIG. 1A is a diagram illustrating periodic autocorrelation.

The invention is described below in reference to the accompany drawings in which like reference numerals denote like parts. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1A is a diagram illustrating periodic autocorrelation. A transmit signal 20, a correlator signal 22, and a resulting output 24 of a correlator (not shown) is shown. The transmit signal 20 is representative of a reflected transmit signal received at the radar system receiver (not shown). Periodic autocorrelation is used in systems employing continuous wave (CW) radar receivers. Due to the nature of the transmit wave form 20 such systems are limited in their ability to establish accurate distances to targets.

The transmit signal 20 is typically a periodic sequence with a period of length N which is also the length of the correlator signal 22. One period of the transmit signal 20 is the correlator signal 22. Both the transmit signal 20 and the correlator signal 22 are represented by binary sequences. Each element of the binary sequences may be a "one" or a "negative one".

If the length N of the correlator signal 22 is even, then it is possible to have sidelobe cancellation at the output of a radar system correlator (matched filter) (not shown). This is because when performing correlation, a particular filter output value is calculated by multiplying each bit (not shown) of the correlator signal 22 with a corresponding bit in the transmit signal, and then summing up the N products. An adjacent filter output value (not shown) is calculated by shifting the transmit signal 20 so that a new bit 28 from the transmit signal 20 is included in the correlation calculation and a previous bit 30 is excluded. When the correlator length N is even, it is possible to have an equal number of positive and negative "ones" after the multiplication of the transmit signal bits with the correlator signal bits resulting in a sum of zero. When performing aperiodic correlation, this is not possible.

The filter output 24 has a mainlobe or correlation peak 32 when the correlator signal 22 overlaps a portion of the transmit signal 20 that is identical to the correlator signal 22. Otherwise, sidelobes 34 result.

Figure 1B:
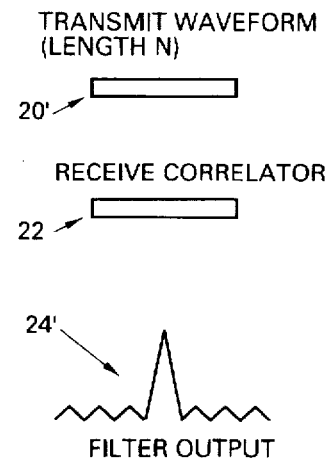
FIG. 1B is a diagram illustrating aperiodic autocorrelation.

Fig. 1B is a diagram illustrating aperiodic autocorrelation. A transmit signal 20', the correlator signal 22, and an output 24' of the correlator (matched filter) is shown. The transmit signal 20' is equivalent to the correlator signal 22. When the matched filter correlates the transmit signal 20' with the correlator signal 22, the number of terms being multiplied alternates from odd to even. Therefore, it is impossible to obtain a plurality of continuous zero magnitude sidelobes.

Figure 2:
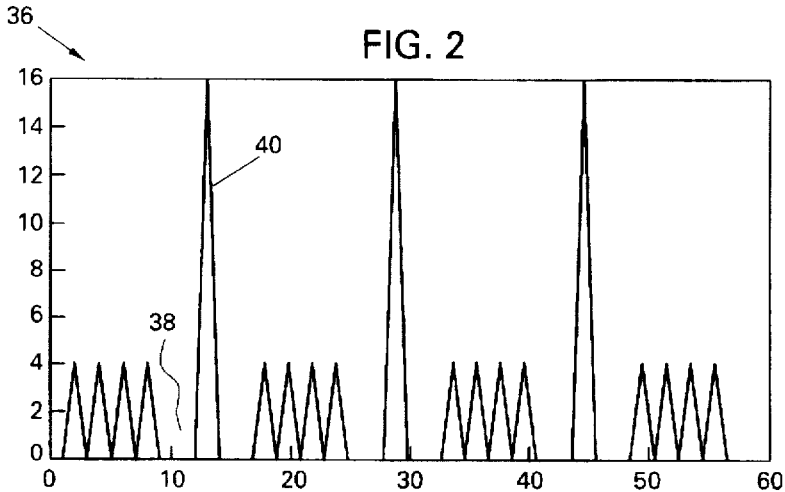
FIG. 2 is an example result from the periodic autocorrelation of a locally optimum sequence of Type A.

FIG. 2 is an example result from the periodic autocorrelation of a locally optimum sequence of Type A. A locally optimum sequence (of period N) has a periodic autocorrelation response 36 with N/4 zeros 38 on each side of a mainlobe 40. Type A sequences have an autocorrelation response where the zero sidelobes 38 are adjacent to the mainlobe 40.

For the present specific example, the Type A sequence is constructed from complementary codes of length N/4. Complementary codes are pairs of binary sequences whose autocorrelation responses have sidelobes of equal magnitude but opposite sign. For example, the code A=[1, 1, 1, −1] and the code B=[1, 1, −1, 1] are complementary codes because their autocorrelation responses are [−1, 0, 1, 4, 1, 0, −1] and [1, 0, −1, 4, −1, 0, 1] respectively. When the autocorrelation responses of the sequences A and B are added together, sidelobe cancellation results.

The periodic sequence with period P=[A, B, −A, B] of length N is the locally optimum sequence of type A with the autocorrelation response 36. The correlator signal is [A, B, −A, B].

A locally optimum sequence of type B is a sequence whose autocorrelation has zero sidelobes in the region [N/4, N/2] on either side of the correlation peak. Those skilled in the art will appreciate that Type B sequences may be used without departing from the scope of the present invention.

Figure 3:
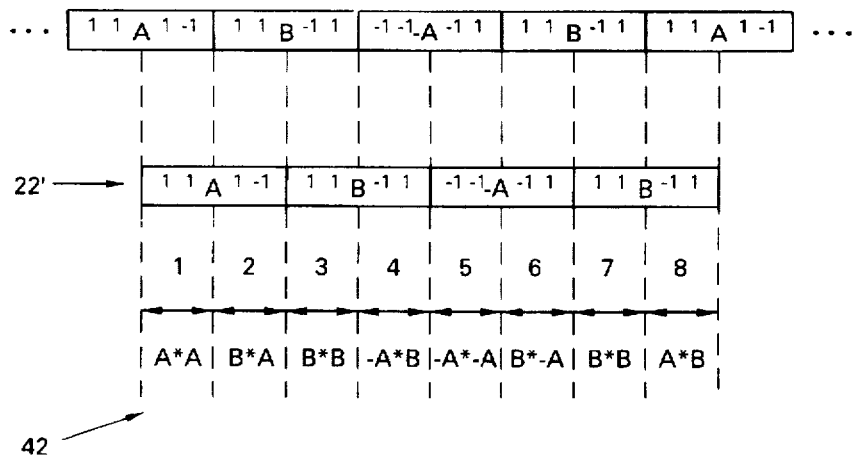
FIG. 3 is a diagram illustrating the range sidelobe cancellations of the autocorrelation of the locally optimum sequence of FIG. 2.

FIG. 3 is a diagram illustrating the range sidelobe cancellations of the autocorrelation of the locally optimum sequence 22' of FIG. 2. A correlator signal 22' is represented by the sequence [A, B, −A, B] and is correlated with a transmit signal sequence 20" with a period corresponding to the correlator signal 22'. The correlator signal 22' is shown shifted two spaces to the right of where a correlation peak would be generated. A correlation peak is generated when the correlator signal 22' overlaps an identical portion of the transmit signal 20". For illustrative purposes, the position of the correlator signal 22' with respect to the transmit signal 20" is shown generating a second zero side lobe (not shown) adjacent to the main peak (not shown). The following discussion applies to the generation of the first, second, third, and fourth sidelobes all of which have zero magnitude.

Let x and y represent any two sequences. The correlation of x and y is denoted as x*y. The following properties hold for correlation:

$$(-x)*(-y)=x*y$$

$$x*(-y)=(-x)*y=-(x*y)$$

Partial correlations 42 are numbered 1 through 8. When partial cross correlations 2 and 6 are added they cancel: B*A+B*(−A)=0. The partial cross correlations 4 and 8 also cancel: $(-A)*B+A*B=0$. In addition the partial correlation 1 $(A*A)$ is a sidelobe from the autocorrelation of code A. The partial correlation 3 $(B*B)$ is a sidelobe from the autocorrelation of code B. Since A and B are complementary codes, partial correlations 1 and 3 cancel each other. Similarly, partial correlations 5 and 7 cancel each other.

Thus, when the partial correlations 42 are added to compute the second zero sidelobe (not shown) the resulting value is zero. The above argument applies to the calculation of the first zero sidelobe where the correlator signal 22' is shifted to the left one (N/16), and the third zero sidelobe where the correlator signal 22' is shifted to the right one (N/16) from its current position. When calculating the fourth zero sidelobe, the correlator signal 22' is shifted to the right two spaces (N/8) from its current position. The correlation is: $A*B+B*(-A)+(-A)*B+B*A=0$, resulting in the fourth zero sidelobe.

Figure 4:
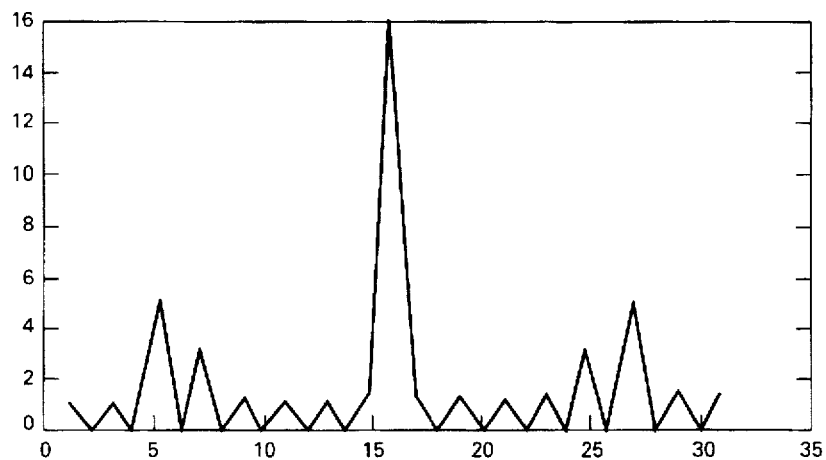
FIG. 4 is a graph of the aperiodic correlation of the sequence of FIG. 2 illustrating the lack of range sidelobe cancellation.

FIG. 4 is a graph of the aperiodic correlation of the sequence of FIG. 2 illustrating the lack of range sidelobe cancellation. When the correlator signal (shown in FIG. 3 as 22') is correlated with an identical signal having length N, no sidelobe cancellation results.

Figure 5:
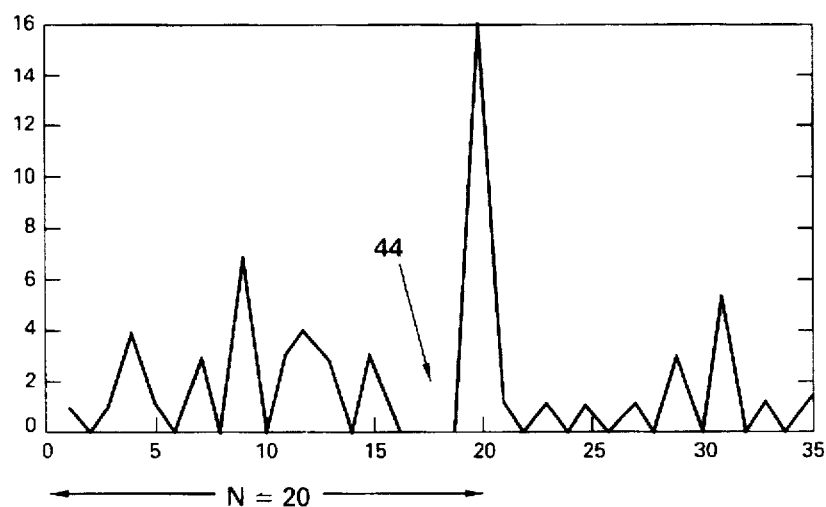
FIG. 5 is a graph of the result of the output of a mismatched filter utilizing complementary codes, and constructed in accordance with the teachings of the present invention.

FIG. 5 is a graph of the result of the output of a mismatched filter utilizing complementary codes, and constructed in accordance with the teachings of the present invention. The mismatched filter (not shown) of the present invention performs aperiodic correlation yet achieves sidelobe cancellation similar to the sidelobe cancellation resulting from periodic autocorrelation such as discussed in FIGS. 2 and 3.

In the present specific embodiment, sidelobe cancellation is achieved by extending a period of the transmit signal (not shown) by a number of bits k from the beginning of the next period. The period of the transmit signal is equivalent to the correlator signal (not shown). As an example, assume the correlator signal is [A, B, -A, B]. The transmit signal is extended to [A, B, -A, B, A]. The resulting correlation shown in FIG. 5 has a peak at N=20, and four zero sidelobes 44.

Those skilled in the art will appreciate that the output of a mismatched filter constructed in accordance with the teachings of the present invention may be made arbitrarily long with variable length regions of zero range sidelobes by selecting the appropriate code length N and the number of bits k.

The result of FIG. 5 was obtained by using the mismatched filter whose sequences were obtained by following a method of the present invention that includes the steps of:

1. obtaining a first and second complementary code;
2. forming a locally optimum sequence of complementary codes having the first complementary code and the second complementary code as sub-sequences and using the locally optimum sequence to represent the correlator signal;
3. designing a transmit signal by extending the locally optimum sequence by a first subset of the locally optimum sequence. The subset depends on the desired number of reduced range sidelobes.

Those skilled in the art will appreciate that the transmit signal and the correlator signal may be switched without departing from the scope of the present invention.

Figure 6A:
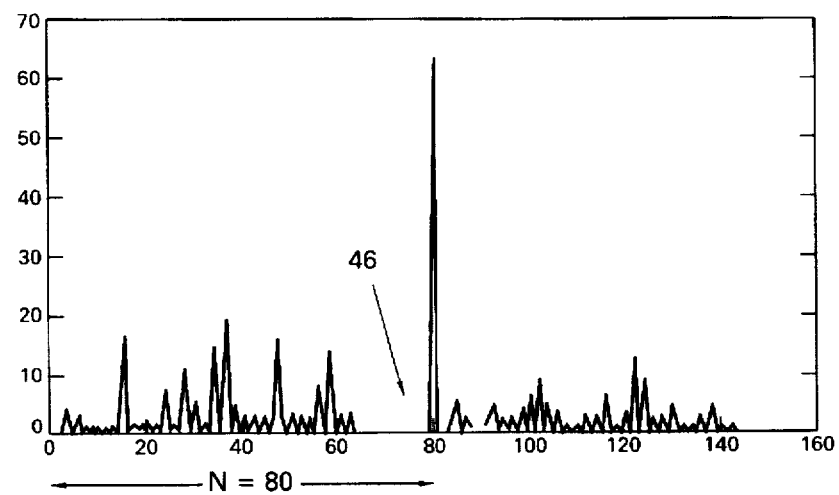
FIG. 6A is a graph showing the output of a mismatched filter using a correlator of length 64 and a transmit wave form of length 80 and constructed in accordance with the teachings of the present invention.

FIG. 6A is a graph showing the output of a mismatched filter using a correlator of length 64 and a transmit wave form of length 80 and constructed in accordance with the teachings of the present invention. The resulting correlation has a peak at N=80 and has sixteen zero sidelobes 46 (k=16). The number of zero sidelobes corresponds to the amount k by which the correlator signal (not shown) is extended to obtain the transmit signal.

Figure 6B:
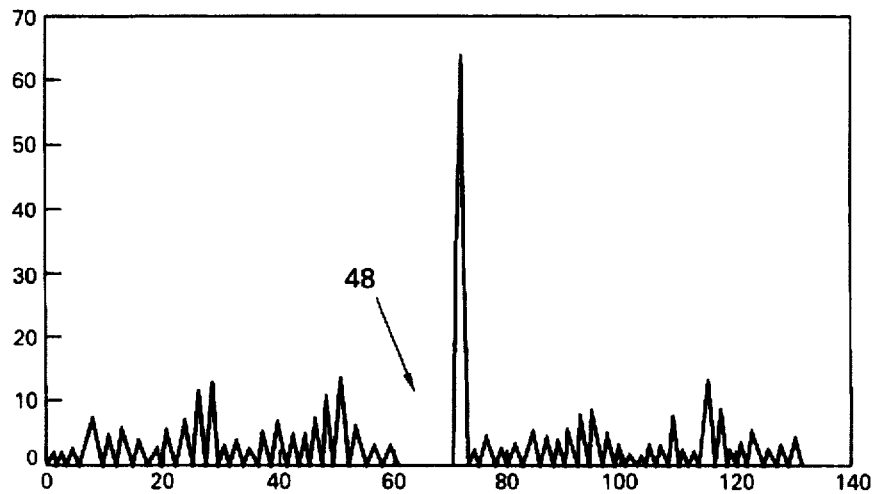
FIG. 6B is a graph showing the output of a mismatched filter using a correlator of length 64 and a transmit wave form of length 72 and constructed in accordance with the teachings of the present invention.

FIG. 6B is a graph showing the output of a mismatched filter using a correlator of length 64 and a transmit wave form of length 72 and constructed in accordance with the teachings of the present invention. The resulting correlation has a peak at N=72 and has k=8 zero sidelobes.

Figure 7:
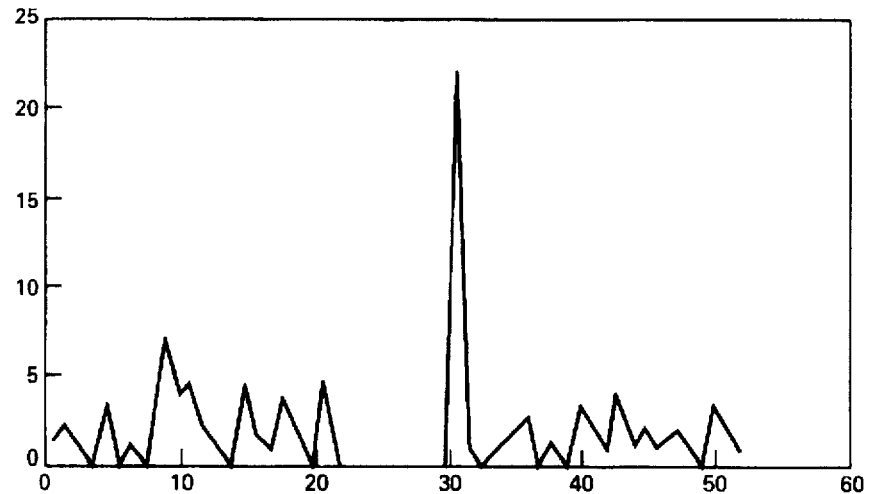
FIG. 7 is a graph showing the output of a mismatched filter using a correlator signal of length 22 and transmit signal of length 31 constructed in accordance with the teachings of the present invention.

FIG. 7 is a graph showing the output of a mismatched filter using a correlator signal of length 22 and a transmit signal of length 31 constructed in accordance with the teachings of the present invention. The resulting correlation has k=9 zero sidelobes.

The result of FIG. 7 was obtained by using a mismatched filter (not shown) whose sequences (not shown) were obtained by the following method of the present invention: performing a computer search to obtain a transmit sequence and a correlator sequence such that the correlation between said transmit sequence and the correlator sequence has a plurality of zero magnitude sidelobes.

Figure 8:
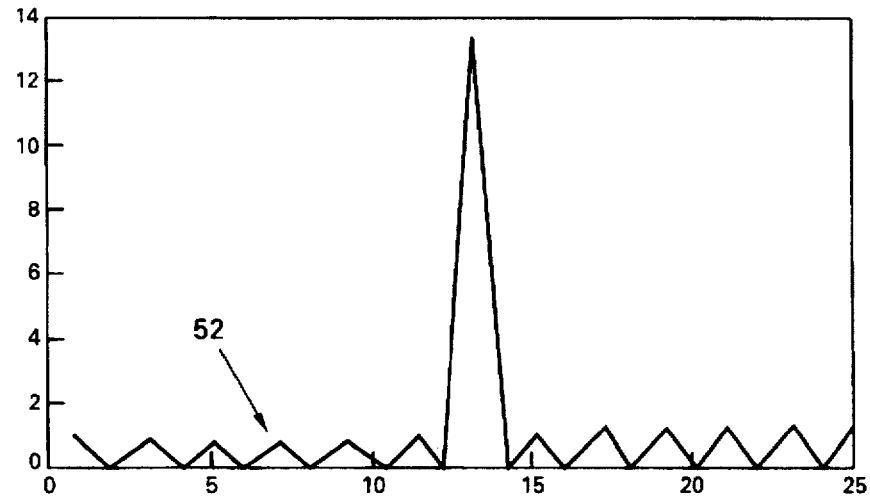
FIG. 8 is a graph showing the result of the periodic autocorrelation of a 13 bit Barker code sequence.

FIG. 8 is a graph showing the result of the periodic autocorrelation of a 13 bit Barker code sequence. Barker codes have autocorrelation sidelobes 52 whose magnitudes are at most one.

A number k of additional bits may be appended to the transmit signal (not shown) or the correlator signal (not shown) to obtain zero sidelobes at the output of the mismatched filter of the present invention (not shown). The k bits may be determined through computer search, or by using an alternative method of the present invention discussed in FIG. 9.

FIG. 9a is a diagram illustrating a technique of the present invention for constructing a mismatched code sequence for a mismatched filter for achieving range sidelobe cancellation. A correlator signal 56 is represented by the Barker-based code $C=[-1, 1, -1, 1, -1, -1, 1, 1, -1, -1, -1, -1]$. In a first test correlation 54 a test transmit signal 58 is formed by appending a 0 bit to the Barker-based code C. The last twelve bits of the test signal 58 are multiplied with corresponding twelve bits in the correlator signal 56 and then added in a correlation process. The result is a preliminary sidelobe value of -1. Only the first eleven bits of the correlator signal 56 contribute to the value of the preliminary sidelobe since the last bit of the test signal 58 is a zero. To obtain a zero sidelobe value 61 in the correlation process the appended 0 bit must be changed to -1. The resulting test signal 60 is shown producing a zero magnitude sidelobe as output. When the twelfth bit (-1) of the code C is multiplied by the appended bit (-1) the result is 1. When 1 is added to the preliminary sidelobe value (-1), the result is a first zero which represents the first zero sidelobe 61. The first appended bit 13 is -1.

To determine the value of the second appended bit 14, a zero is appended to the resulting test signal 60, which results in a second test signal 62 (see FIG. 9b). A second test correlation 57 is similar to the first test correlation 54 with the exception that the second test signal 62 is used in place of the test signal 58 in the first test correlation 54. The output of the test correlation 57 is 1. This implies that the appended 0 bit 14 must be changed to a 1 as shown in a second resulting signal 64. When the bit 14 (1) of the second resulting signal 64 is multiplied by the twelfth bit (-1) of the code C and added to the output of the test correlation 57 (1), the result is a second zero sidelobe 63.

The above process is repeated (see FIG. 9c) to obtain the third appended bit 15 to produce a third zero sidelobe 65. The output of a third test correlation 59 is the appended bit 15.

Let n represent the number of bits in a test signal. C(n−1) represents a test correlation output with bits (n−11) to (n−1). As long as C(n−1) has unity magnitude, a zero sidelobe may be obtained. Using the above method with the correlator signal 56, five zero sidelobes are obtained because C(17)=3 which does not have a unity amplitude. The resulting test signal is [−1, 1, −1, 1, −1, −1, 1, 1, −1, −1, −1, −1, −1, 1, −1, 1, −1] and is used as the final transmit signal and has length N=17. The resulting mismatched code set is a (12/17) set, meaning that the correlator signal is 12 bits long, and the transmit signal is 17 bits long.

The fourth appended bit (not shown) and the fifth appended bit (not shown) are determined by following the above pattern for determining appended bits. In general, the output of the test correlations 54, 57, 59 corresponds to the appended bits 13, 14, 15.

In the event that the twelfth bit of the correlator signal 56 was 1, then the appended bits would correspond to negative of the output of the corresponding test correlations. As a general rule an appended bit n of a test signal may be found using the following equation: C(n−1)+(last bit of correlator signal 56)*(bit n of the test signal)=0.

Those skilled in the art will appreciate that the final transmit signal and the correlator signal may be switched without departing from the scope of the present invention.

The above technique for determining a transmit signal and a correlator signal for providing number of reduced range sidelobes at the output of a radar system correlator has the following steps:

1. obtaining a Barker code and dropping one bit if the Barker code has an odd length;
2. correlating the Barker code with a shifted version of the Barker code for obtaining a correlation output value;
3. forming an extended sequence by appending a sequence value to the shifted Barker code so that the resulting correlation between the shifted Barker code and the Barker code cancels said correlation output value resulting in a zero; and
4. repeating the above steps as necessary to form extended sequence that will result in a pre-determined number of zero range sidelobes when correlated with the Barker code in a radar system correlator (not shown).

Figure 10:
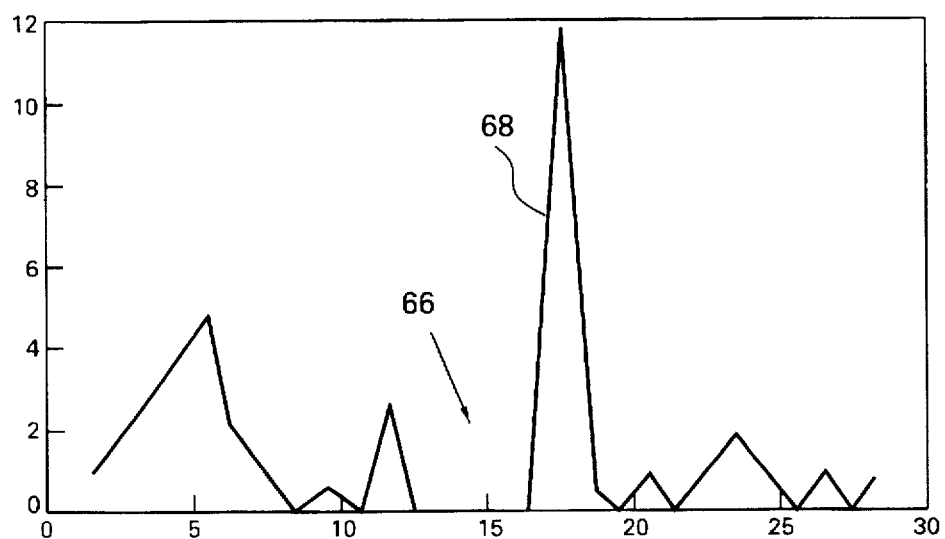
FIG. 10 is a graph showing the output of the mismatched filter constructed using the technique of FIG. 9.

FIG. 10 is a graph showing the output of the mismatched filter constructed using the technique of FIGS. 9a–9c. Five zero sidelobes 66 are shown adjacent to a main peak 68.

Correlation data presented up to this point is based on sequences with a constant amplitude throughout the entire sequence. This corresponds to target returns with zero frequency (DC pulses). In most radar receivers target returns have a small remaining frequency component related to a Doppler shift induced by the target velocity. The received pulse has a small sinusoidal amplitude modulation referred to as uncompensated Doppler. In addition, the target return has a noise component. Thus, the radar system correlator (not shown) correlates a correlator signal with a received signal that is not the exact transmit signal. This has the effect of degrading the range sidelobe response of the biphase (0 degrees and 180 degrees corresponding to 1 and −1 respectively) code contained in the pulse. The mismatched codes developed in accordance with the teachings of the present invention are no more vulnerable to uncompensated Doppler than their matched counterparts.

Figure 11:
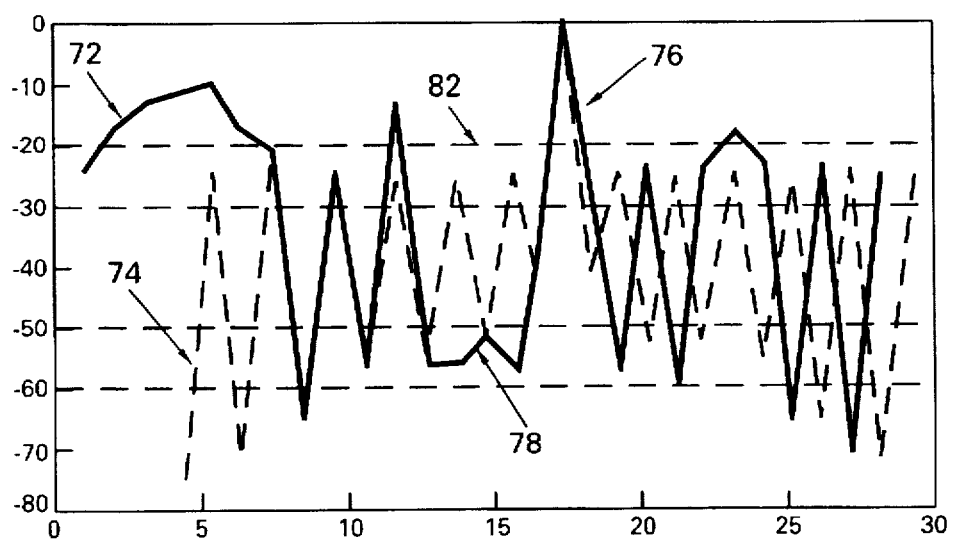
FIG. 11 is a graph comparing the result of the aperiodic autocorrelation of a 13 bit Barker code sequence and the result of the output of the mismatched filter of FIG. 9 under uncompensated Doppler conditions.

FIG. 11 is a graph comparing a result of the aperiodic autocorrelation 74 of a 13 bit Barker code sequence and a result 72 of the output of the mismatched filter of FIG. 10 under uncompensated Doppler conditions. For FIG. 11, the extended transmit signal [−1, 1, −1, 1, −1, −1, 1, 1, −1, −1, −1, −1, −1, 1, −1, 1, −1] of the mismatched filter of FIG. 10 is used as the correlator signal (not shown) and the correlator signal [−1, 1, −1, 1, −1, −1, 1, 1, −1, −1, −1, −1] of FIG. 10 is used as the transmit signal (not shown).

The graph of FIG. 11 is based on a sampling frequency of 10 Mhz which corresponds to a range separation or range gate size of 15 meters between samples. The transmit signals are amplitude modulated by a cosine (not shown) of unit amplitude and an uncompensated Doppler frequency of 10 Khz. In the present example, the initial phase of the cosine is 30 degrees.

The vertical axis represents decibels (dB) relative to the corresponding correlation peaks 76 at 0 dB. The result 72 of the 12/17 code set of FIG. 10 has significantly reduced range sidelobes 78 in comparison to range sidelobes 82 of the autocorrelation response 74.

Generally, the applicability of mismatched codes of the present invention to reducing range sidelobes is not affected by uncompensated Doppler.

Figure 12:
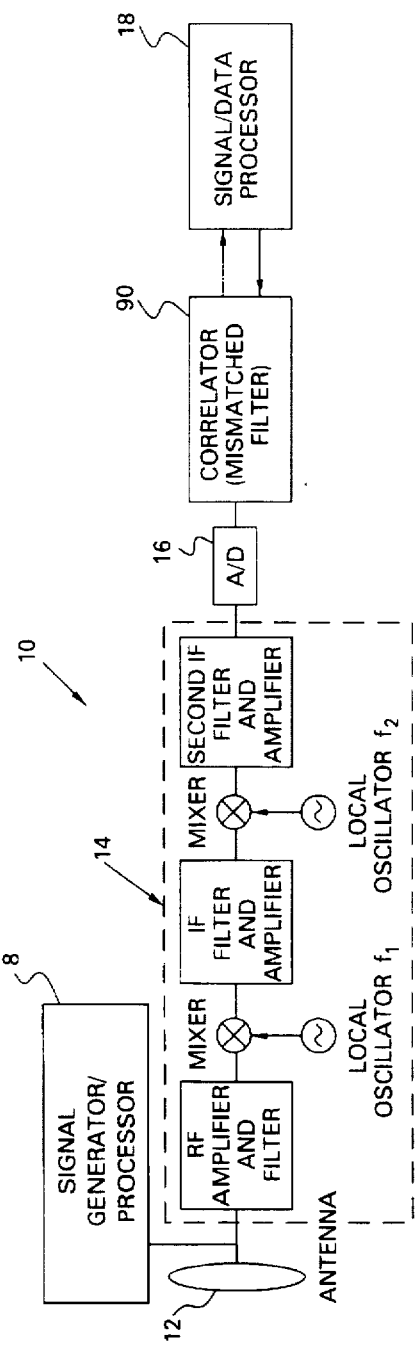
FIG. 12 is a block diagram of a radar system constructed in accordance with the teachings of the present invention.

FIG. 12 is a block diagram of a radar system 10 constructed in accordance with the teachings of the present invention. The radar system 10 includes a signal generator 8 that is used to generate pulsed radar signals that are transmitted via an antenna 12. Transmitted signals reflect off targets (not shown) and are received at the antenna 12. Received analog signals are processed by a set 14 of filters, amplifiers, mixers, and oscillators before being converted to a digital format by an analog to digital converter 16. The resulting digital signal is input to a mismatched filter 90 that correlates the digital signal with a correlator signal of a different length. The output of the mismatched filter 90 having reduced range sidelobes is then input to a processor 18 for further analysis. The processor 18 may be implemented as a computer running target detection software.

The signal generator 8 may also be implemented as a computer that may be used to determine the transmit signal (not shown) and the correlator signal (not shown) for providing the reduced range sidelobes at the output of the mismatched filter 90.

Those skilled in the art will appreciate that if the mismatched filter 90 is an analog correlator, the positions of the analog to digital converter 16 and the filter 90 may be switched without departing from the scope of the present invention.

Figure 13:
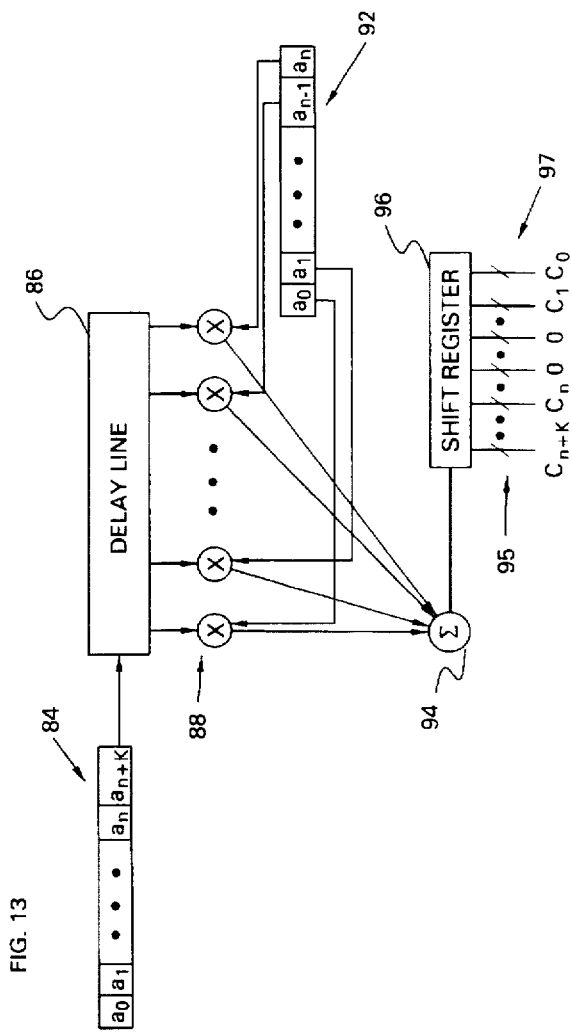
FIG. 13 is diagram of a mismatched filter constructed in accordance with the teachings of the present invention.

FIG. 13 is diagram of a mismatched filter 90 constructed in accordance with the teachings of the present invention. The mismatched filter 90 includes an extend transmit sequence 84 that represents a received signal, a delay line 86, a set of multipliers 88, a correlator sequence 92, an adder 94, and an output shift register 96.

A programmable signal generator (not shown) generates the transmit sequence 84 which is extended by k extra bits beyond that of a correlator sequence 92. The transmit sequence 84 is shifted into the delay line 86 one bit at a time. As the sequence 84 is shifted into the delay line 86, the multipliers 88 multiply each bit of the sequence 84 with a corresponding bit in the correlator sequence 92. The multiplied bits are then summed in the adder 94 to produce a value for the correlation response which is shifted into the shift register 96. When the correlation of the signal 84 with the correlator signal 92 is finished, the shift register 96 has k zero sidelobes 97 included among the values 95 available from the shift register 96.

In the present specific embodiment, the length of the shift register 96 is the same as the length of the input shift register 84. Those skilled in the art will appreciate that the correlator output sequence contained in the shift register 96 does not need to have the same length as the sequence values stored in the shift register 84. The shift register 96 may have different lengths depending on the application.

Those skilled in the art will also appreciate that the delay line 86 may be a shift register, that the sequences 84 and 92 may be switched without departing from the scope of the present invention, and that an adjustable length correlator of conventional design may be used without departing from the scope of the present invention. In addition, the mismatched filter 90 may be implemented in computer software.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for reducing range sidelobes in a binary phase coded pulsed radar system comprising:
    means for providing a received binary phase coded signal having a first length;
    means for providing a binary phase coded correlator signal having a second length different from said first length; and
    mismatched filter means for correlating said received signal with said correlator signal for providing a predetermined number of reduced range sidelobes at the output of said mismatched filter means.

2. The invention of claim 1 wherein said means for providing said received signal is a radar system transceiver.

3. The invention of claim 1 wherein said means for providing said correlator signal is a radar system correlator.

4. The invention of claim 1 further including means for determining said received signal and said correlator signal to provide a predetermined number of reduced range sidelobes at an output of said mismatched filter means.

5. The invention of claim 4 wherein said means for determining said received signal and said correlator signal is a computer.

6. The invention of claim 5 wherein said computer is used to perform a search on possible received signals and on possible correlator signals for determining magnitude profiles and lengths of the received signals and the correlator signals for providing a pre-determined number of reduced range sidelobes at the output of said mismatched filter means.

7. The invention of claim 1 wherein said received signal is a reflected transmit signal having an additional noise component.

8. The invention of claim 1 further including a correlator having a first locally optimum sequence that is said correlator signal.

9. The invention of claim 8 wherein said mismatched filter means has an input for receiving an extended locally optimum sequence that is said received signal.

10. The invention of claim 9 wherein said first locally optimum sequence is a sub-sequence of said extended locally optimum sequence.

11. The invention of claim 1 wherein said mismatched filter means has a Barker-based code that is said correlator signal.

12. The invention of claim 11 wherein said mismatched filter means has an input for receiving an extended Barker-based code that is said version of said transmit signal, said extended Barker-based code including said Barker-based code as a sub-sequence.

13. The invention of claim 1 wherein said mismatched filter means is implemented with an adjustable length correlator and a programmable signal transmitter.

14. A method for determining a transmit signal and a correlator signal for a binary phase coded pulsed radar system for providing a predetermined number of reduced range sidelobes at the output of a radar system correlator comprising the steps of:
    obtaining a first and second complementary binary phase code;
    forming a locally optimum sequence of complementary codes having said first complementary code and said second complementary code as sub-sequences, said locally optimum sequence representing said correlator signal; and
    designing a transmit signal by extending said locally optimum sequence by a first subset of said locally optimum sequence.

15. A method for determining a transmit signal and a correlator signal for a binary phase coded pulsed radar system for providing a predetermined number of reduced range sidelobes at the output of a radar system correlator comprising the steps of:
    obtaining a Barker-based code having an even length;
    correlating said Barker-based code with a shifted version of said Barker-based code for obtaining a correlation output value;
    forming an extended sequence by appending a sequence value to said shifted Barker-based code so that the resulting correlation between said shifted Barker-based code and said Barker-based code cancels said correlation output value resulting in a zero; and
    repeating the above steps as necessary to form said extended sequence that will result in a pre-determined number of zero range sidelobes when correlated with said Barker-based code in said radar system correlator.

16. The invention of claim 15 wherein said sequence value is said correlation output value.

17. The invention of claim 15 wherein said Barker-based code is [−1, 1, −1, 1, −1, −1, 1, 1, −1, −1, −1, −1, −1, ].

18. The invention of claim 15 wherein said extended sequence is [−1, 1, −1, 1, −1, −1, 1, 1, −1, −1, −1, −1, −1, 1, −1, 1, −1].

* * * * *